Patented Aug. 27, 1946

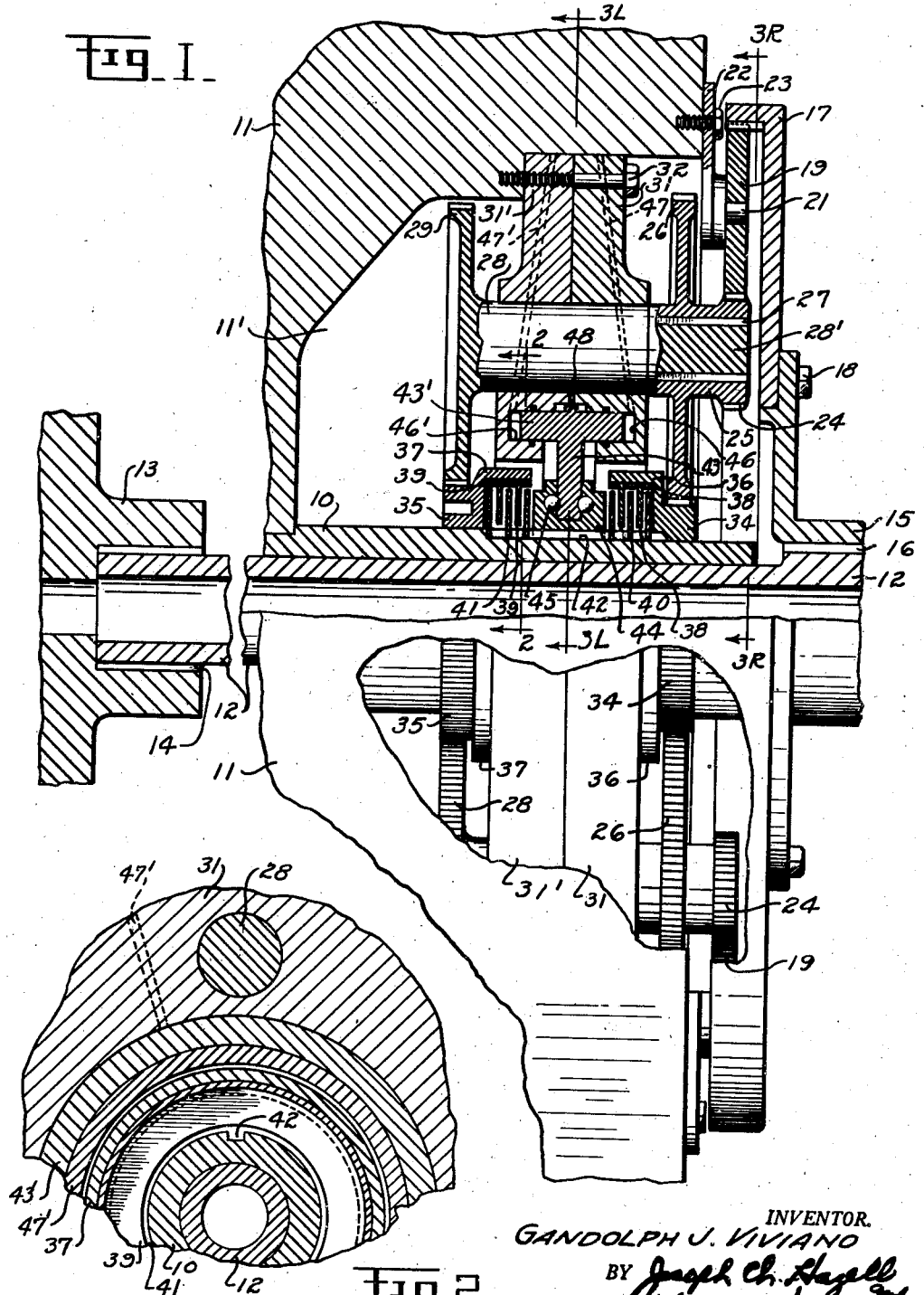

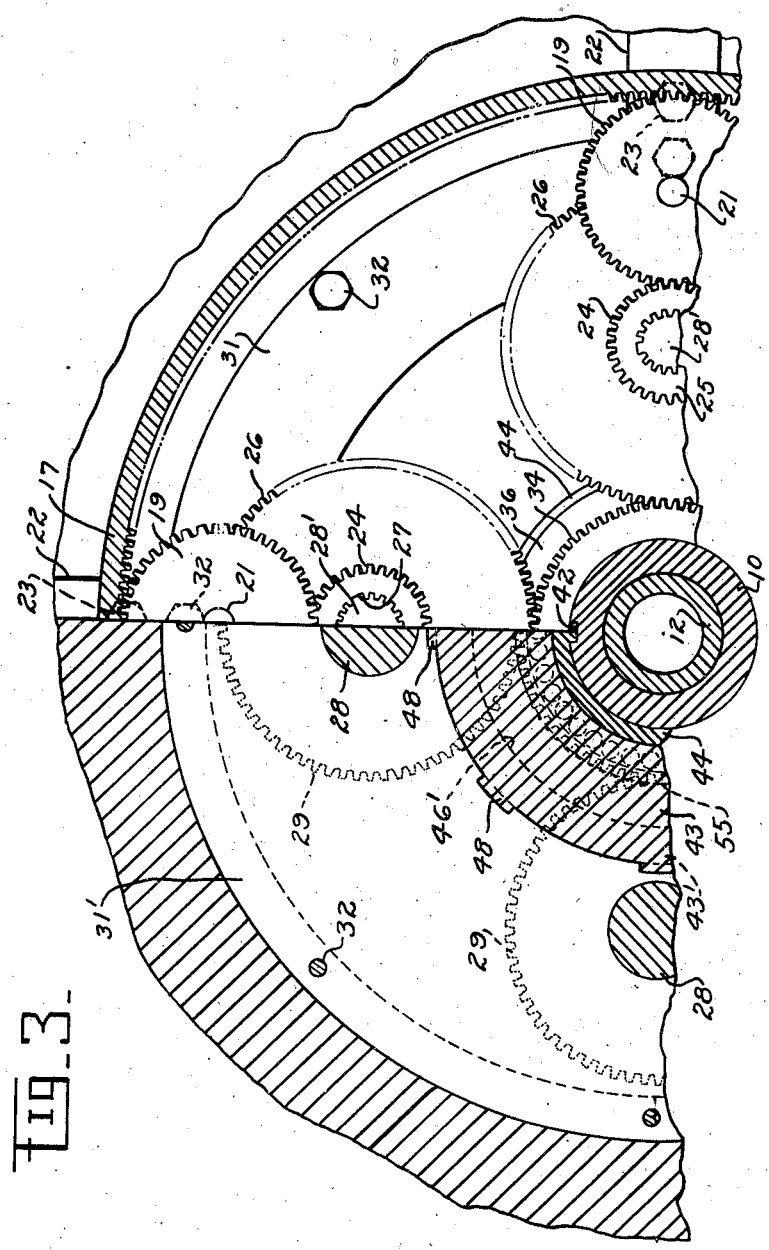

2,406,417

UNITED STATES PATENT OFFICE 2,406,417

TWO-SPEED DRIVE FOR SUPERCHARGERS

Gandolph J. Viviano, Ridgewood, N. J.

Application August 30, 1944, Serial No. 551,944

7 Claims. (Cl. 74—370)

(Granted under the act of March 3, 1883, as amended April 30, 1928; 370 O. G. 757)

The invention described herein may be manufactured and used by or for Government for governmental purposes, without the payment to me of any royalty thereon.

This invention relates to a change speed gear drive, and more particularly to a two-speed gear assembly adapted for driving the impeller of a supercharger.

One of the objects of this invention is to provide a change speed drive wherein the change of speed will be accomplished with a minimum of difference in the R. P. M.'s between the contacting clutch elements, so as to greatly diminish the shock to the clutches and the strain on the gear train that is usually encountered in the present change speed drives on supercharger devices of this kind; and this is preferably accomplished by the use of improved sets of change speed gearing and interspaced clutch discs associated therewith, which are hydraulically actuated to operate at the selected speed.

Another object of this invention is to provide, in such a change speed gear drive which is actuated by fluid pressure, an actuator which is not rotatable, so that the oil employed under pressure in conjunction therewith for moving the actuator will not be subjected to rotary churning motion or heating.

A further object of this invention is to provide a clutch disc driven, hydraulically actuated, two-speed gear drive for the impeller shaft of a supercharger, whereby the shock on the clutches in changing the speed is greatly minimized or wholly avoided, and the churning of oil or pressure fluid in actuating the device is also obviated.

These and various other objects and advantages are attained with this invention, as will become apparent from the description, taken in connection with the accompanying drawings wherein the invention is shown in its preferred form, it being evident that other arrangements and forms of construction may be resorted to for carrying out the objects and purposes of this invention.

In the drawings:

Fig. 1 is a fragmentary view, partly in section and partly broken away, showing this invention mounted around the impeller shaft and the drive shaft of a supercharger and placed in its neutral position.

Fig. 2 is a detail sectional view thereof, taken on line 2—2 of Fig. 1.

Fig. 3 is a fragmentary compound view comprising two sections, the right-hand half showing a section taken on section line 3R of Fig. 1, and the left-hand half showing a section taken on section line 3L of Fig. 1.

The drawings illustrates this invention in a preferred embodiment used in conjunction with the drive means of an airplane supercharger, and it is shown in the form of a two-speed gear drive arranged concentrically around the impeller shaft or driven shaft 10 and positioned in a pocket 11' provided in the rear part of the housing 11 of the supercharger. Said shaft 10 is mounted concentrically around and rotary on the drive shaft or tail shaft 12 which is secured to the engine crank shaft 13 by spline means 14 and is driven by the crank shaft at the same rate of speed.

A starter coupling 15 is splined at 16 to the drive shaft 12, and it has a large internally toothed ring gear 17 secured thereon by means 18. Said gear 17 meshes with a set of intermediate idler pinions 19 arranged around the impeller shaft, each pinion being rotatably mounted on a trunnion 21 provided on a stationary bracket 22 secured on the rear part of the supercharger housing 11, by means 23, the gears being held in place on the trunnions by any suitable means.

Each pinion 19 meshes with an intermediate gear 24 which is preferably made integral with a sleeve 25 that carries the high speed gear 26 integral thereon. The sleeve is splined by means 27 on the reduced end part 28' of shaft 28 which carries the low speed gear 29 fixed on its inward end and preferably formed integral thereon. Hereby these pinions 19 and gears 24, 26 and 29 will all rotate in unison.

The shafts 28 with the gears 24, 26 and 29 thereon are carried in a two piece support 31 and 31'. The supports are mounted stationary in the pocket 11' in the housing, by suitable means 32.

A high speed clutch gear 34 and a low speed clutch gear 35 are mounted to rotate on impeller shaft 10, and they mesh with high speed gears 26 and 29, respectively. The two clutch gears 34 and 35 are provided, respectively, with sleeve portions 36 and 37 which carry series of inwardly extending spaced clutch discs 38 and 39, respectively; and a pair of series of clutch discs 40 and 41 are interengagingly positioned between said discs 38 and 39, respectively, and are splined by means 42 to the impeller shaft to rotate therewith but to be movable longitudinally thereof. The interengaged discs 38 and 40 thus provide a high speed set, and the discs 39 and 41 a low speed set of companion discs.

Hydraulically operated actuating means is provided herein, including an actuator 43 in the form of a piston, provided with a rotary actuating member 44 in the form of a sleeve splined to the impeller shaft, by the means 42, to rotate therewith but to be slidable longitudinally thereof, said sleeve being placed between the sets of discs 40 and 41 and rotates along therewith at the same rate of speed. End thrust between the piston 43 and the sleeve 44 is taken up by the two races of ball bearings 45.

The actuator 43 has on its two opposite sides two annular piston portions 43' movable in annular recesses 46 and 46' which are provided in the two supports or brackets 31 and 31'. Channels 47 and 47' lead through the supports to the recesses 46 and 46', being provided with the usual control valve means (not shown), for selectively conducting oil under pressure through either one of the channels 47, 47' to its respective recess 46, 46', whereby to shift the actuator 43 and sleeve 42 and thereby actuate the respective set of clutch discs 40, 38, or 41, 39, for operating the impeller shaft through either the high speed or the low speed set of gears. Said actuator is mounted in the housing 11, as indicated in the drawings, and it is kept from revolving by means of peripheral lugs 48 which engage in notches provided in the supports 31, 31'. Thus the piston actuator 43 is held against rotation but is free to move forward and backward, longitudinally of the impeller shaft, while the sleeve is arranged to revolve with the impeller shaft as well as to slide forward and backward thereon along with the actuator thereby causing interengagement between the companion discs of the selected set of discs and compress them one against the other, to actuate through either the high speed or the low speed set of gears.

The advantage of this type and arrangement of clutch discs is that, in shifting therewith from one speed to another, the difference in R. P. M.'s is considerably less, thereby decreasing the shock to the clutch, than the type of drive wherein a single multiplate clutch is used. Furthermore, in this form of clutch actuating means only the inner actuating sleeve is rotary, and at the speed of the adjoining discs, but not the associated main part or actuator which is engaged and actuated by the oil under pressure, and is not rotary. This non-rotation of the oil-engaging part of this actuating means thus eliminates the heating and sludging of oil as is normally found in the customary rotating actuating mechanisms, because of the centrifugal action.

I claim:

1. In a supercharger change speed gear drive including a drive shaft and an impeller shaft, a gear drive comprising a ring gear actuated by the drive shaft, a plurality of sets of gears mounted around said shafts, each set including a high speed gear and a low speed gear and an intermediate gear connected to rotate together, gears engaged and driven by said ring gear, one for driving each intermediate gear, a high speed clutch gear and a low speed clutch gear rotary on the impeller shaft and meshing, respectively, with the high speed gear and the low speed gear, and means operable for selectively operating through either said high-speed clutch gear or said low-speed clutch gear.

2. In a change speed gear drive for a supercharger including a drive shaft and an impeller shaft concentric therewith and rotary thereon, a gear drive comprising an internally toothed ring gear operatively connected with the drive shaft, a high speed gear and a low speed gear and an intermediate gear and means connecting them to rotate together in unison, a pinion driven by said ring gear and meshing with said intermediate gear, a high speed clutch gear and a low speed clutch gear rotary on the impeller shaft and meshing, respectively, with the high speed and the low speed gear, and actuating means selectively operable for rendering either clutch gear active and thereby operate either at high speed or at low speed.

3. In a change speed drive for a supercharger having a driving shaft and an impeller shaft concentric therewith, a plurality of drives of different ratios associated with the two shafts, supporting means rotatively supporting said drives and provided with recesses and means for conducting oil thereto, rotary clutch means incorporated with each drive, each including a set of interengageable discs on the clutch means and on the impeller shaft, selector means operable to actuate either clutch means and render its associated drive operative, said selector means comprising a sleeve mounted on said impeller shaft to rotate therewith but to slide relative thereto and being engageable with either one of the sets of discs, and a companion piston member in said recesses being engaged and operated by oil under pressure therein to shift said sleeve, the piston member being shiftable axially of the shaft but being held against rotation therewith, thereby obviating any rotary motion of the oil engaging member and churning of the engaged oil.

4. In a two-speed drive for a supercharger having a drive shaft and an impeller shaft concentric therewith and rotary thereon, said drive comprising a set of high speed and a set of low speed driven members, means connected with the drive shaft and actuated thereby for actuating said high speed and low speed driven members, a high speed clutch member and a low speed clutch member secured on the impeller shaft to rotate therewith, a series of clutch discs secured to each clutch member, a series of discs operably interengaging with each series of said clutch discs and being splined to and movable longitudinally of the impeller shaft, supporting means provided with recesses therein and with channels for conveying oil under pressure to said recesses, actuating means including piston means operable by the oil under pressure in said recesses, being movable axially of the shaft but held against rotation, and companion sleeve means rotary with the impeller shaft but slidable longitudinally thereon and moved by the piston means for selectively engaging and actuating either series of shaft discs and thereby operate through either the high speed or the low speed drive.

5. In a two-speed gear drive for a supercharger including a drive shaft and an impeller shaft concentric therewith and rotary thereon, a gear drive comprising an internally toothed gear operatively connected with the drive shaft, a plurality of sets of gears mounted around said shafts, each set including a high speed gear and a low speed gear and an intermediate gear and means connecting them together to rotate in unison, a support rotatably supporting said connecting means and gears, pinions driven by said toothed gear and meshing with said intermediate gears, a high speed clutch gear and a low speed clutch gear rotary on the impeller shaft and meshing, respectively, with said high speed gear and said low speed gear, actuating means mounted in said support and including a sleeve rotary with but shiftable longitudinally of the impeller shaft for rendering either clutch gear operative, and an actuator including a piston operable in a recess provided in said support and being actuated by oil under pressure in said recess for shifting the sleeve into operation, the actuator being held against rotation in the support to avoid churning of the oil engaged by the actuator.

6. In a two-speed gear drive for a supercharger including a drive shaft and an impeller shaft concentric therewith and rotary thereon, a gear drive comprising an internally toothed gear operatively connected with the drive shaft, a gear assembly including a high-speed gear and a low-speed gear and an intermediate gear and a shaft connecting the gears in axial alignment to rotate them in unison, a support secured on the housing of the supercharger and rotatably supporting said shaft, there being a pair of recesses in the support and channels to convey oil to said recesses, a pinion driven by said toothed gear and meshing with said intermediate gear, a high-speed clutch gear and a low-speed clutch gear rotary on the impeller shaft and meshing respectively with said high-speed gear and said low-speed gear, actuating means mounted in said support and including a sleeve rotary with but shiftable longitudinally of the impeller shaft for rendering either clutch gear operative, and an actuator including piston means operable by the oil in said recesses for shifting the sleeve into operation, said actuator being held against rotation in said support to avoid churning of the oil engaged by the actuator.

7. In a supercharger change speed gear drive including a drive shaft and an impeller shaft concentric therewith, a ring gear driven by the drive shaft, a gear drive assembly including a shaft having a high-speed gear and a low-speed gear and an intermediate gear secured thereon in axial alignment to rotate in unison, a pinion driven by said ring gear and driving said assembly, a high-speed clutch gear and a low-speed clutch gear meshing with and actuated by said high-speed gear and said low-speed gear, and means operable for selectively operating through either said high-speed clutch gear or said low-speed clutch gear.

GANDOLPH J. VIVIANO.